(12) United States Patent
Du

(10) Patent No.: US 11,907,700 B2
(45) Date of Patent: Feb. 20, 2024

(54) UPGRADING METHOD AND SYSTEM, SERVER, AND TERMINAL DEVICE

(71) Applicant: BOE Technology Group Co., Ltd., Beijing (CN)

(72) Inventor: Hongjun Du, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 354 days.

(21) Appl. No.: 17/419,698

(22) PCT Filed: Oct. 26, 2020

(86) PCT No.: PCT/CN2020/123722
§ 371 (c)(1),
(2) Date: Jun. 29, 2021

(87) PCT Pub. No.: WO2021/083083
PCT Pub. Date: May 6, 2021

(65) Prior Publication Data
US 2022/0083326 A1   Mar. 17, 2022

(30) Foreign Application Priority Data
Oct. 29, 2019   (CN) .......................... 201911038192.4

(51) Int. Cl.
*G06F 8/65* (2018.01)
(52) U.S. Cl.
CPC ...................... *G06F 8/65* (2013.01)
(58) Field of Classification Search
USPC ........................................................ 717/170
See application file for complete search history.

(56) References Cited

U.S. PATENT DOCUMENTS

| 8,429,630 | B2 * | 4/2013 | Nickolov ............ H04L 67/1021 |
| | | | 717/148 |
| 8,554,748 | B1 * | 10/2013 | Kamity ............... G06F 9/44578 |
| | | | 707/634 |
| 2005/0283662 | A1 | 12/2005 | Li et al. |
| 2010/0306319 | A1 | 12/2010 | Brzozowski |
| 2017/0180137 | A1 * | 6/2017 | Spanier ................. H04L 9/3247 |

(Continued)

FOREIGN PATENT DOCUMENTS

| CN | 1567843 A | 1/2005 |
| CN | 1578307 A | 2/2005 |

(Continued)

OTHER PUBLICATIONS

"SSH Protocol Explained"; n-able.com web log; Aug. 8, 2019 (Year: 2019).*

(Continued)

*Primary Examiner* — Qing Chen
*Assistant Examiner* — Clint Thatcher
(74) *Attorney, Agent, or Firm* — IPro, PLLC

(57) ABSTRACT

An upgrading method, includes: a server first sends a version check command to a terminal device; then receives feedback data sent by the terminal device based on the version check command; and sends an upgrade command to the terminal device in response to the terminal device being to be upgraded, wherein whether the terminal device is to be upgraded is determined based on the feedback data.

16 Claims, 4 Drawing Sheets

(56) References Cited

U.S. PATENT DOCUMENTS

| | | | | |
|---|---|---|---|---|
| 2019/0250898 A1* | 8/2019 | Yang | ............... | H04W 12/08 |
| 2020/0014531 A1* | 1/2020 | Falco | ............... | H04L 63/0884 |
| 2020/0142683 A1* | 5/2020 | Rao | ............... | G06F 9/4411 |
| 2021/0058412 A1* | 2/2021 | Rowland | ............... | H04L 9/0825 |
| 2022/0083326 A1* | 3/2022 | Du | ............... | G06F 8/71 |

FOREIGN PATENT DOCUMENTS

| | | | |
|---|---|---|---|
| CN | 101009589 A | 8/2007 | |
| CN | 101557308 A | 10/2009 | |
| CN | 102136085 A | 7/2011 | |
| CN | 103546809 A | 1/2014 | |
| CN | 104125276 A | 10/2014 | |
| CN | 106027580 A | 10/2016 | |
| CN | 107104814 A | 8/2017 | |
| CN | 108337120 A | 7/2018 | |
| CN | 109560931 A | 4/2019 | |
| CN | 110764807 A | 2/2020 | |
| KR | 20110007378 A | 1/2011 | |

OTHER PUBLICATIONS

Raymond Chen; "How Do I Get File Version Information from the Command Line?—The Old New Thing"; Microsoft.com devblogs website; May 29, 2018 (Year: 2018).*
Sofija Simic; "How to Use wget Command with Examples"; PhoenixNAP.com website; Oct. 22, 2019 (Year: 2019).*
Sana Ajani; "Visual Studio Code Remote SSH Tips and Tricks"; visualstudio.com web log; Oct. 3, 2019 (Year: 2019).*
CN201911038192.4 First office action.
CN201911038192.4 Notification to grant patent right for invention.

* cited by examiner

UPGRADING METHOD AND SYSTEM, SERVER, AND TERMINAL DEVICE

CROSS-REFERENCE TO RELATED APPLICATIONS

This application is a US national stage of international application No. PCT/CN2020/123722, filed on Oct. 26, 2020, which claims priority to Chinese Patent Application No. 201911038192.4, filed on Oct. 29, 2019 and entitled "UPGRADING METHOD AND SYSTEM, SERVER, AND TERMINAL DEVICE," the disclosures of which are herein incorporated by reference in their entireties.

TECHNICAL FIELD

The present disclosure relates to the field of communication technologies, in particular to an upgrading method, a system, a server, and a terminal device.

BACKGROUND

At present, various electronic devices are provided in various scenarios to perform corresponding tasks. For example, routers provided in public places may provide wireless networks, display terminals may display content, and cameras may perform monitoring.

Generally, in response to the electronic devices being to be upgraded, the electronic devices may send upgrade requests to a server, and the server acquires upgrade files, and perform an upgrade operation on the electronic devices based on the upgrade files.

SUMMARY

The present disclosure provides an upgrading method, a system, a server, and a terminal device.

In an aspect, an upgrading method is provided, which is applicable to a server. The method includes: sending a version check command to a terminal device; receiving feedback data sent by the terminal device based on the version check command; and sending an upgrade command to the terminal device in response to the terminal device being to be upgraded, wherein whether the terminal device is to be upgraded is determined based on the feedback data. That is, in response to determining, based on the feedback data, that the terminal device is to be upgraded, an upgrade command is sent to the terminal device.

Optionally, sending the version check command to the terminal device includes: acquiring an upgrade task; determining a candidate upgrade terminal device based on the upgrade task; and sending the version check command to an online candidate upgrade terminal device in response to detecting the candidate upgrade terminal device being online.

Optionally, the upgrade task includes upgrade version number information, and the feedback data includes version number information of a candidate upgrade object of the terminal device; and the method further includes: reading the upgrade version number information in the upgrade task; and determining that the terminal device is to be upgraded in response to the upgrade version number information being not matched with the feedback data.

Optionally, the upgrade task includes a digest value of an upgrade object, and the feedback data includes a digest value of the candidate upgrade object of the terminal device; and the method further includes: reading the digest value of the upgrade object in the upgrade task; and determining that the terminal device is to be upgraded in response to the digest value of the upgrade object being not matched with the feedback data.

Optionally, the upgrade task includes a storage address of an upgrade file package; and sending the upgrade command to the terminal device includes: reading the storage address of the upgrade file package in the upgrade task; and sending the upgrade command including the storage address to the terminal device.

Optionally, the method further includes: generating a first command body based on a first command parameter and identification information of the terminal device; generating first signature information based on a predetermined first private key and the first command body; and generating the version check command including a first command name, the first command body, and the first signature information; wherein the first command parameter includes a command parameter in the version check command, the first command body includes a command body in the version check command, the first signature information includes signature information in the version check command, the first command name is a name of the version check command.

Optionally, the method further includes: acquiring a first command name, a first command parameter, and identification information of the terminal device; generating a first command body based on the first command parameter and the identification information of the terminal device; and generating the version check command including the first command name and the first command body; wherein the first command name is a name of the version check command, the first command parameter includes a command parameter in the version check command, and the first command body includes a command body in the version check command.

Optionally, the method further includes: generating a second command body based on a second command parameter and the identification information of the terminal device; generating second signature information based on a predetermined second private key and the second command body; and generating the upgrade command including a second command name, the second command body, and the second signature information; wherein the second command parameter includes a command parameter in the upgrade command, the second command body includes a command body in the upgrade command, the second signature information includes signature information in the upgrade command, and the second command name is a name of the upgrade command.

Optionally, the method further includes: acquiring a second command name, a second command parameter, and identification information of the terminal device; generating a second command body based on the second command parameter and the identification information of the terminal device; and generating the upgrade command including the second command name and the second command body; wherein the second command name is a name of the upgrade command, the second command parameter includes a command parameter in the upgrade command, and the second command body includes a command body in the upgrade command.

In another aspect, an upgrading method is also provided, which is applicable to a terminal device. The method includes: receiving a version check command sent by a server;

reading information of a candidate upgrade object as feedback data based on the version check command; sending the feedback data to the server; receiving an upgrade command sent by the server, wherein the upgrade command is sent in response to the server determining, based on the feedback data, that the terminal device is to be upgraded; and acquiring an upgrade file package based on the upgrade command, and upgrading the candidate upgrade object with the upgrade file package.

Optionally, reading the information of the candidate upgrade object as the feedback data based on the version check command includes: reading version number information of the candidate upgrade object as the feedback data; or reading a digest value of the candidate upgrade object as the feedback data.

Optionally, acquiring the upgrade file package based on the upgrade command includes: reading a storage address of the upgrade file package in the upgrade command; acquiring the upgrade file package based on the storage address; and upgrading the candidate upgrade object with the upgrade file package includes: decompressing the upgrade file package to acquire an upgrade script; performing an upgrade operation by executing the upgrade script.

Optionally, the version check command includes a first command body and first signature information; and upon receiving the version check command sent by the server, the method further includes: verifying, based on a predetermined first public key, whether the first command body is matched with the first signature information; and reading the information of the candidate upgrade object as the feedback data based on the version check command includes: reading the information of the candidate upgrade object as the feedback data based on the version check command in response to the first command body being matched with the first signature information.

Optionally, the upgrade command includes a second command body and second signature information; and upon receiving the upgrade command sent by the server, the method further includes: verifying, based on a predetermined second public key, whether the second command body is matched with the second signature information; and acquiring the upgrade file package based on the upgrade command includes: acquiring an upgrade file package based on the upgrade command in response to the second command body being matched with the second signature information.

In still another aspect, an upgrading system is also provided. The upgrading system includes a server and a terminal device. The server is configured to send a version check command to the terminal device. The terminal device is configured to receive the version check command, read information of a candidate upgrade object as feedback data based on the version check command, and send the feedback data to the server. The server is further configured to receive the feedback data, and send an upgrade command to the terminal device in response to the terminal device being to be upgraded, wherein whether the terminal device is to be upgraded is determined based on the feedback data. The terminal device is further configured to acquire an upgrade file package based on the upgrade command in response to receiving the upgrade command, and upgrade the candidate upgrade object with the upgrade file package.

In yet another aspect, a server is also provided. The server includes a memory, a processor, and a computer program stored in the memory and runnable on the processor, wherein the processor, when running the computer program, is caused to perform any one of the above upgrading methods applicable to the server.

In yet another aspect, a terminal device is also provided. The terminal device includes a memory, a processor, and a computer program stored in the memory and runnable on the processor, wherein the processor, when running the computer program, is caused to perform any one of the above upgrading methods applicable to the terminal device.

In addition, a server is also provided. The server includes: a sending module, configured to send a version check command to a terminal device; a receiving module, configured to receive feedback data sent by the terminal device based on the version check command; wherein the sending module is further configured to send an upgrade command to the terminal device in response to the terminal device being to be upgraded, wherein whether the terminal device is to be upgraded is determined based on the feedback data.

Optionally, the sending module is configured to: acquire an upgrade task; determine a candidate upgrade terminal device based on the upgrade task; send the version check command to an online candidate upgrade terminal device in response to detecting the candidate upgrade terminal device being online.

Optionally, the upgrade task includes upgrade version number information, and the feedback data includes version number information of a candidate upgrade object of the terminal device; the server further includes a processing module, configured to read the upgrade version number information in the upgrade task, and determine that the terminal device is to be upgraded in response to the upgrade version number information being not matched with the feedback data.

Optionally, the upgrade task includes a digest value of an upgrade object, and the feedback data includes a digest value of a candidate upgrade object of the terminal device; the server further includes a processing module, configured to read a digest value of an upgrade object in the upgrade task, and determine that the terminal device is to be upgraded in response to the digest value of the upgrade object being not matched with the feedback data.

Optionally, the upgrade task includes a storage address of an upgrade file package; the sending module is configured to read a storage address of an upgrade file package in the upgrade task, and send an upgrade command including the storage address to the terminal device.

Optionally, the server further includes a processing module, configured to: generate a first command body based on a first command parameter and identification information of the terminal device; generate first signature information based on a predetermined first private key and the first command body; and generate the version check command including a first command name, the first command body, and the first signature information; wherein the first command parameter includes a command parameter in the version check command, the first command body includes a command body in the version check command, the first signature information includes signature information in the version check command, and the first command name is a name of the version check command.

Optionally, the server further includes a processing module, configured to: acquire a first command name, a first command parameter and identification information of the terminal device; generate a first command body based on the first command parameter and the identification information of the terminal device; and generate the version check command including the first command name and the first command body; wherein the first command name is a name of the version check command, the first command parameter includes a command parameter in the version check command, and the first command body includes a command body in the version check command.

Optionally, the server further includes a processing module, configured to: generate a second command body based on a second command parameter and the identification information of the terminal device; generate second signature information based on a predetermined second private key and the second command body; and generate an upgrade command including a second command name, the second command body and the second signature information; wherein the second command parameter includes a command parameter in the upgrade command, the second command body includes a command body in the upgrade command, the second signature information includes signature information in the upgrade command, and the second command name is a name of the upgrade command.

Optionally, the server further includes a processing module, which is configured to: acquire a second command name, a second command parameter and the identification information of the terminal device; generate a second command body based on the second command parameter and the identification information of the terminal device; generate an upgrade command including the second command name and the second command body; wherein the second command name is the name of the upgrade command, the second command parameter includes a command parameter in the upgrade command, and the second command body includes a command body in the upgrade command.

In addition, a terminal device is further provided. The terminal device includes: a receiving module, configured to receive a version check command sent by a server; a processing module, configured to read information of a candidate upgrade object as feedback data based on the version check command; a sending module, configured to send the feedback data to the server; wherein the receiving module is further configured to receive an upgrade command sent by the server, and the upgrade command is sent in response to the server determining, based on the feedback data, that the terminal device is to be upgraded; and the processing module is further configured to acquire an upgrade file package based on the upgrade command, and upgrade the candidate upgrade object with the upgrade file package.

Optionally, the processing module is configured to: read version number information of the candidate upgrade object as the feedback data; or read a digest value of the candidate upgrade object as the feedback data.

Optionally, the processing module is configured to: read a storage address of an upgrade file package in the upgrade command; acquire an upgrade file package based on the storage address; decompress the upgrade file package to acquire an upgrade script; and perform an upgrade operation by executing the upgrade script.

Optionally, the version check command includes a first command body and first signature information; and the processing module is further configured to verify, based on a predetermined first public key, whether the first command body is matched with the first signature information, and read information of a candidate upgrade object as feedback data based on the version check command in response to the first command body being matched with the first signature information.

Optionally, the upgrade command includes a second command body and second signature information; the processing module is further configured to verify, based on a predetermined second public key, whether the second command body is matched with the second signature information, and acquire an upgrade file package based on the upgrade command in response to the second command body being matched with the second signature information.

In addition, a non-transitory computer-readable storage medium is also provided. The non-transitory computer-readable storage medium stores a computer program therein, wherein the computer program stored in the computer non-transitory readable storage program, when running on a processor of a server, causes the server to perform any one of the above upgrading methods applicable to a server; and when running on a processor of a terminal device, causes the terminal device to perform any one of the above upgrading methods applicable to a terminal device.

DETAILED DESCRIPTION

For clearer descriptions of the objectives, technical solutions and advantages of the present disclosure, the present disclosure is further described in detail hereinafter in conjunction with embodiments and with reference to the accompanying drawings.

It should be noted that all the expressions with the terms "first" and "second" as modifiers in the embodiments of the present disclosure are intended to distinguish two different entities with the same name or different parameters with the same name. Therefore, the terms "first" and "second" are only for convenience of expression, and should not be construed as a limitation to the embodiments of the present disclosure, and the description thereof will not be repeated in subsequent embodiments.

At present, in response to electronic devices is to be upgraded, upgrade requests may be sent to a server. In response to acquiring upgrade files, the server performs upgrade operations on the electronic devices based on the upgrade files. However, if a large number of electronic devices are to be upgraded at the same time or within the same time period, a great load of upgrade is caused to the server.

The embodiments of the present disclosure provide an upgrading method applicable to a server, an upgrading method applicable to a terminal device, a server, a terminal device, and an upgrading system. The terminal device may be various devices to be upgraded, such as a router, a display terminal, or a camera, which is not specifically limited. The upgrading system is first introduced in detail.

Figure 1:
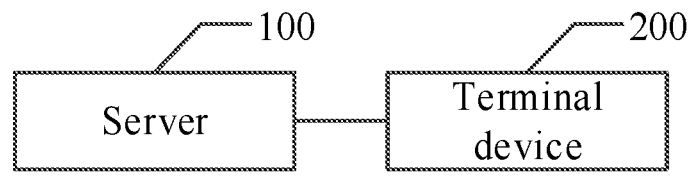
FIG. 1 is a schematic structural diagram of an upgrading system according to an embodiment of the present disclosure.
Figure 2:
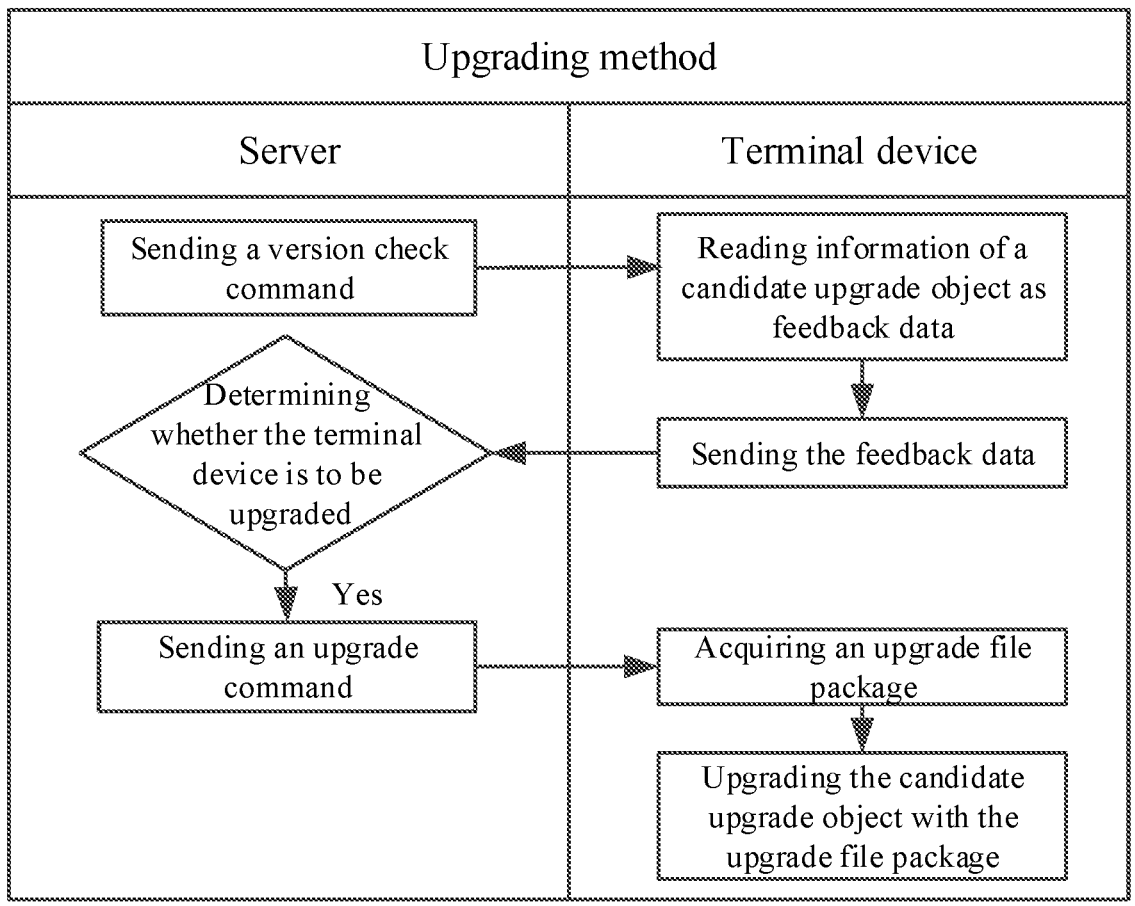
FIG. 2 is a schematic diagram of an interaction between a server and a terminal device according to an embodiment of the present disclosure.

FIG. 1 is a schematic structural diagram of an upgrading system according to an embodiment of the present disclosure. As shown in FIG. 1, the upgrading system includes: a server 100 and a terminal device 200. The interaction process between the server 100 and the terminal device 200 may be shown in FIG. 2.

The server 100 is configured to send a version check command to the terminal device 200.

The terminal device 200 is configured to receive the version check command sent by the server 100, read information of a candidate upgrade object as the feedback data based on the version check command, and send the feedback data to the server 100.

The server 100 is further configured to receive the feedback data, determine whether the terminal device 200 is to be upgraded, based on the feedback data, and send an upgrade command to the terminal device 200 in response to the terminal device 200 being to be upgraded.

The terminal device 200 is further configured to acquire an upgrade file package based on the upgrade command in response to receiving the upgrade command, and upgrade the candidate upgrade object with the upgrade file package.

In one embodiment, data is transmitted between the terminal device 200 and the server 100 based on Message Queuing Telemetry Transport (MQTT) protocol. Alternatively, in another embodiment, data may be transmitted between the terminal device 200 and the server 100 based on MQTTS (MQTT+TLS; TLS: Transport Layer Security) protocol; by encrypting the transmission channel, the security of data transmission is improved. Alternatively, data may be transmitted between the terminal device 200 and the server 100 based on Transmission Control Protocol (TCP) or Constrained Application Protocol (CoAP) (an Internet of things protocol) or other protocols capable of performing a long connection, which is not listed in detail here.

In one embodiment, the terminal device 200 is configured with a first agent process; the server 100 accesses a second agent process; data is transmitted between the first agent process and the second agent process based on the MQTT protocol, or MQTTS protocol, or TCP, or CoAP. Taking the MQTT protocol as an example, a cross-platform application implemented based on the Portable Operating System Interface (POSIX C) may be configured in the terminal device 200, and the application runs in the background in a daemon, the application is the first agent process.

For example, the second agent process may be Broker (a message broker). Both the server 100 and the first agent process configured in the terminal device access the Broker. The Broker may be configured in the server 100, or the Broker may be configured in other devices, and the server 100 accesses the device configured with the Broker. The application configured in the terminal device 200 receives the commands sent by the server by the Broker, such as the version check command and the upgrade command described above.

For example, the above candidate upgrade object may be a software or a configuration file or other files to be upgraded. The specific upgrade object is not limited.

For example, both the version check command and the upgrade command may include a command name and a command body. The command name is a name of the command to be executed, and the command body may include a parameter required to execute the command. For example, the server may assemble the command name and the command body into a command in a JSON (JavaScript Object Notation, JS object notation) format. The specific format of the command is not limited.

In one embodiment, generating the command (the version check command or the upgrade command) by the server may include: acquiring a command name of the command to be executed, a command parameter, and identification information of a target terminal device; generating a command body based on the command parameter and the identification information of the terminal device; and generating a command including the command name and the command body.

For example, the identification information of the terminal device may be a device serial number, or may be a Media Access Control (MAC) address of the terminal device, or may be other information capable of identifying the terminal device, which is not specifically limited. The terminal device subscribes to a topic after the server and the terminal device access the Broker, and the server may send the command to the terminal device by Publish.

In another embodiment, generating the version check command by the server may include: generating a first command body based on a first command parameter and the identification information of the terminal device; generating first signature information based on a predetermined first private key and the first command body; and generating a command including a first command name, the first command body, and the first signature information.

In another embodiment, generating the upgrade command by the server may include: generating a second command body based on a second command parameter and the identification information of the terminal device; generating second signature information based on a predetermined second private key and the second command body; and generating a command including a second command name, the second command body and the second signature information.

In order to distinguish the descriptions, the command parameter in the version check command is called a first command parameter, and the command parameter in the upgrade command is called a second command parameter. The command body in the version check command is called the first command body, and the command body in the upgrade command is called the second command body. Signature information in the version check command is called the first signature information, and signature information in the upgrade command is called the second signature information. The private key for generating the first signature information is called the first private key, and the private key for generating the second signature information is called the second private key. The public key corresponding to the first private key is called the first public key, and the public key corresponding to the second private key is called the second public key.

In response to the version check command including the first command body and the first signature information, the terminal device may verify, based on the predetermined first public key, whether the first command body and the first signature information are matched with each other after receiving the version check command sent by the server. In response to the first command body being matched with the first signature information, the subsequent steps are performed. In response to the upgrade command including the second command body and the second signature information, the terminal device may verify, based on the predetermined second public key, whether the second command body and the second signature information are matched with each other after receiving the upgrade command sent by the server. In response to the second command body being matched with the second signature information, the subsequent steps are performed.

For example, the command (the version check command or the upgrade command) may include: an identity (ID) of the command, the type of the device that sends the command, the command name, the command body, and signature information. The command body may include the parameter for executing the command and device identification information of the terminal device, and the like.

In one embodiment, the version check command may be a shell command. Assuming that the candidate upgrade object is the software program file "myapp," the format of the version check command may be:

```
{
    "id":20190730002,                //ID of the command
    "from":"upgrade_server",         //identification information of the server that
sends the command, wherein the server is an upgrading server
    "command":"shell",               //command name: shell
    "body":{"cmd":"/usr/bin/myapp --version","sn":"A0BB3ED2BF3D"}, //command
      body:
wherein the cmd represents the shell command to be executed, the /usr/bin represents the
installation directory of the software, the software version number may be acquired by the
/usr/bin/myapp --version command, and the sn represents the device identification information
of the terminal device
    "sig":"signature information"    //signature information
}
```

The parameters in the above "/usr/bin/myapp --version" may be understood as the parameters required to execute the version check command, or be interpreted as the first command parameter.

In one embodiment, the upgrade command may be another format of command (which is not a shell command). Still assuming that the candidate upgrade object is the software program file "myapp", the format of the upgrade command may be:

The above download tool and download address and the like may all be understood as parameters required for executing the upgrade command, which are interpreted as the second command parameter in the embodiments of the present disclosure. The md5 value of the upgrade package is the value acquired by calculating the upgrade package with the md5 digest algorithm (Message-Digest Algorithm, a widely used cryptographic hash function). The md5 value of the upgrade package may be used to verify whether the upgrade package is tampered.

In one embodiment, generating the signature information by the server may include: encoding the command body with the first encoding algorithm to acquire the first encoded command body; generating the signature information based on the predetermined private key and the first encoded command body; encoding the signature information with the second encoding algorithm to acquire encoded signature information; in this way, the signature information in the command (the version check command or the upgrade command) is the encoded signature information.

For example, the first encoding algorithm may be a secure hash algorithm (SHA) 256 (also referred to as sha256 algorithm), the second encoding algorithm may be a base64 encoding algorithm, and the signature information in the command may be a base64 encoded character string. Alternatively, other encoding algorithms may also be adopted, and the specific algorithms are not limited.

In this embodiment, in response to receiving the command (the version check command or the upgrade command), the terminal device encodes the command body with the first encoding algorithm to acquire the first encoded command body; decodes the signature information with the

```
{
    "id":20190730003,                //ID of the command
    "from":"upgrade_server",         //identification information of the server that
sends the command, wherein the server is an upgrading server
    "command":"upgrade",             //command name: upgrade
    "body":{
        "downloadCmd":"wget
http://fileserver.boe.com.cn/publicFile/M00/00/07/Cvxg910ufBSANe-bAAk2jVjzCE08302.gz
",                                   //the download command for the upgrade package,
wherein: the wget represents the download tool, the content behind the wget represents the
download address
        "upgradeScript":"upgrade.sh",    //the default value is upgrade.sh, which
may be omitted
        "md5":"36fe52b1f17326f64b5c625361818045",   //md5 value of the upgrade
package
        "sn":"A0BB3ED2BF3D"          //device identification information of the
terminal device
    },                               //command body
    "sig":"signature information"    //signature information
}
``` decoding algorithm corresponding to the second encoding algorithm to acquire second decoded signature information; and verifies, based on the predetermined public key, whether the first encoded command body and the second decoded signature information are matched with each other. In response to the first encoded command body being matched with the second decoded signature information, the subsequent steps are performed.

Continuing with the above example, the signature information in the command may be decoded with the decoding algorithm corresponding to the base64 encoding algorithm. In order to distinguish the descriptions, data acquired by decoding is called "second decoded signature information." The command body may be encoded using the sha256 algorithm. In order to distinguish the descriptions, data acquired by encoding is called "first encoded command body."

The server and the terminal device predetermine a public key and a private key. For example, the public key may be an RSA (an asymmetric encryption algorithm) public key, and the private key may be an RSA private key. The server generates the signature information based on the RSA private key. The terminal device verifies, based on the RSA public key, whether the first encoded command body and the second decoded signature information are matched with each other. In response to the first encoded command body being matched with the second decoded signature information, it means that the command (the version check command or the upgrade command) is not tampered, nor is it a forged command, and then the terminal device performs the subsequent steps. It may be understood as security verification of the command (the version check command or the upgrade command), which can filter out the tampered command, and can also identify the forged command, thus improving the security of upgrade.

In one embodiment, the terminal device may further verify whether the device identification information in the command body is the same as the identification information of the terminal device, in response to the first encoded command body being matched with the second decoded signature information. In response to the device identification information in the command body being the same as the identification information of the terminal device, the command (the version check command or the upgrade command) is not tampered, nor is it a forged command, and then the terminal device performs the subsequent steps. It may be understood as security verification of the command (the version check command or the upgrade command), which can further filter out the tampered command, and can also further identify the forged command, thus further improving the security of the upgrade.

In one embodiment, the terminal device may feed back the verification result to the server in the process of verifying the security of the command. The command may further include a command identification, and the terminal device may feed back the security verification result to the server based on the command identification, such that the server determines which command the security verification result is for.

In an example, in response to the first encoded command body being not successfully matched with the second decoded signature information, the terminal device sends first prompt information including the corresponding command identification to the server.

In another example, in response to the device identification information in the command body being different from the identification information of the terminal device, the terminal device sends second prompt information including the corresponding command identification to the server.

In another example, third prompt information including the upgrade command identification may be sent to the server in response to the terminal device executing the upgrade command, such that the server acquires execution status of the upgrade command.

In one embodiment, the server may acquire an upgrade task, determine the candidate upgrade terminal device based on the upgrade task, and send a version check command to an online candidate upgrade terminal device in response to detecting the candidate upgrade terminal device being online.

For example, relevant personnel may configure an upgrade task in the server, and the upgrade task includes the identification information of the terminal device that may be upgraded, the download address of the upgrade file package and the like. In one embodiment, the upgrade task may further include upgrade version number information, that is, version number information of the upgraded file or software. Alternatively, in another embodiment, the upgrade task may further include a digest value of an upgrade object, that is, a value acquired by performing a digest algorithm on the upgraded file or software. For example, the digest algorithm may be the md5 digest algorithm, and the digest value may be the md5 value. The specific content of the upgrade task is not limited.

In response to acquiring the upgrade task, the server determines the candidate upgrade terminal device by reading the upgrade task, wherein the candidate upgrade terminal device is a terminal device that may be upgraded; and then the server may monitor whether the candidate upgrade terminal device is online. In response to the candidate upgrade terminal device being online, a version check command is sent to the online candidate upgrade terminal device.

In one embodiment, in response to receiving the version check command, the candidate upgrade terminal device may first perform security verification on the version check command (optional step). The process of the security verification has been described in the above content, which is not repeated here. After the version check command passes the security verification, the candidate upgrade terminal device determines the candidate upgrade object by analyzing the version check command, wherein the candidate upgrade object is the file or software that may be upgraded.

In one embodiment, the candidate upgrade terminal device may read version number information of the candidate upgrade object as the feedback data. Alternatively, in another embodiment, the candidate upgrade terminal device may read the digest value of the candidate upgrade object as the feedback data. The digest value may be a value acquired by performing the digest algorithm on the candidate upgrade object. For example, the digest algorithm may be an md5 digest algorithm, and the digest value may be an md5 value. For example, in response to the candidate upgrade object not having a version number, the candidate upgrade terminal device may take the digest value of the candidate upgrade object as the feedback data.

The terminal device sends the feedback data to the server. In one embodiment, the server reads the upgrade version number information in the upgrade task; determines whether the upgrade version number information matches with the feedback data. In response to the upgrade version number information being not matched with the feedback data, the terminal device is to be upgraded. In another embodiment, the server reads the digest value of the upgrade object in the upgrade task; determines whether the digest value of the upgrade object matches with the feedback data. In response to the digest value of the upgrade object being not matched with the feedback data, the terminal device is to be upgraded.

For example, in response to the upgrade task including the upgrade version number information, the feedback data is the version number information of the candidate upgrade object. In response to the upgrade version number information being matched with the version number information of the candidate upgrade object, the candidate upgrade object is the latest version and is not to be upgraded. In response to the upgrade version number information being not matched with the version number information of the candidate upgrade object, the candidate upgrade object is not the latest version and is to be upgraded. In response to the upgrade task including the digest value of the upgrade object, the feedback data is the digest value of the candidate upgrade object. In response to the digest value of the upgrade object being matched with the digest value of the candidate upgrade object, the candidate upgrade object is the latest version and is not to be upgraded. In response to the digest value of the upgrade object being not matched with the digest value of the candidate upgrade object, the candidate upgrade object is not the latest version and is to be upgraded.

For example, as described above, the upgrade task may include the download address of the upgrade file package, such that the server may read the storage address of the upgrade file package in the upgrade task, and send the upgrade command including the storage address to the terminal device.

The terminal device may read the storage address of the upgrade file package in the upgrade command; acquire the upgrade file package based on the storage address; decompress the upgrade file package to acquire the upgrade script; and perform the upgrade operation by executing the upgrade script.

For example, the upgrade package may include the upgrade script upgrade.sh, and other files required for the upgrade. The terminal device may execute the upgrade script upgrade.sh, which automatically performs the upgrade operation based on the files in the upgrade package. In this way, there is no need to modify the configuration of the terminal device, and the upgrade logic may be flexibly customized with the upgrade script.

With performing the embodiments in the present disclosure, in a first aspect, the server actively checks the version in the terminal device, and upgrades the terminal device only when the version is to be upgraded. In this way, the server may determine the timing of upgrade. The server may actively disperse the upgrade time period, or actively disperse the devices storing the upgrade file packages, thus reducing the occurrence of situations that multiple devices are upgraded at the same time and the upgrade file packages in the same device are accessed at the same time, and reducing the upgrade load.

In a second aspect, in the related art, the terminal device accesses the server by polling to determine whether the latest version exists, so as to upgrade the version. In this way, the access load of the server is high. However, in the present disclosure, the server actively initiates version checking, and may actively disperse the timing of version checking, thus reducing access load.

In a third aspect, in one embodiment, the upgrade file package includes an upgrade script, and the terminal device performs the upgrade operation by executing the upgrade script. In this way, the configuration of the terminal device does not need to be modified, and the upgrade logic may be flexibly customized with the upgrade script.

Figure 3:
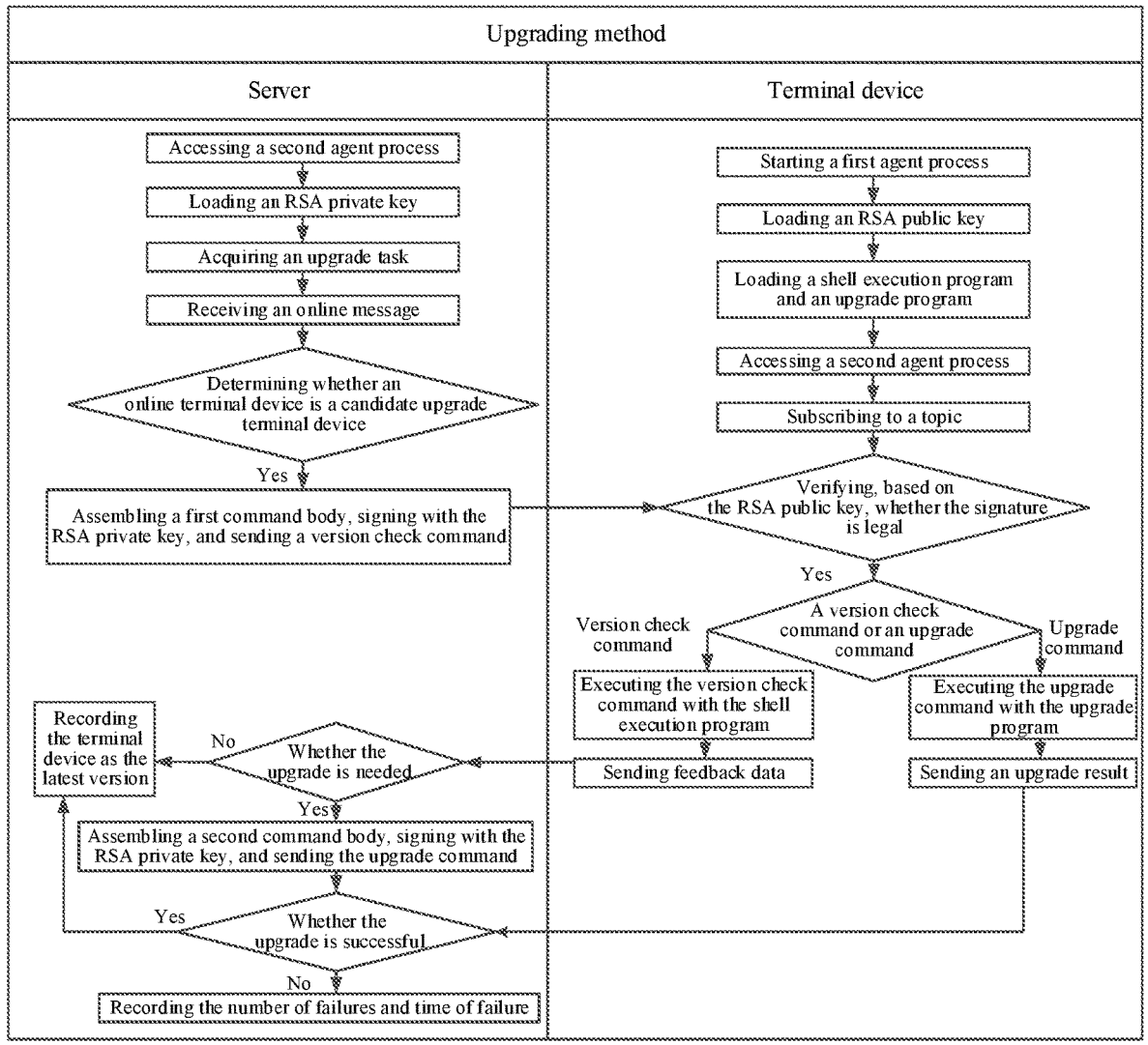
FIG. 3 is a schematic diagram of another interaction between a server and a terminal device according to an embodiment of the present disclosure.

Referring to FIG. 3, a specific embodiment is described hereinafter.

For the terminal device:

a cross-platform application based on POSIX C may be configured in the terminal device. The application runs in the background in a daemon, and the application is the first agent process. For example, the application may load a command processing program to execute the version check command (shell command) and the upgrade command. The application may subscribe to receive the command sent by the server. The application may perform security verification on the received command, and send the command that passes the security verification to the corresponding command processing program.

The command processing program may include a shell execution program and an upgrade program. The shell execution program may execute the version check command and send the execution result to the server by Publish. The upgrade program may perform operations such as verifying, downloading, decompressing of the upgrade file package, and executing the upgrade script, and send the execution result to the server by Publish.

The terminal device starts the first agent process, loads the RSA public key, loads the shell execution program and the upgrade program. In addition, the terminal device accesses the second agent process, wherein the first agent process and the second agent process communicate based on the MQTT protocol. The terminal device subscribes to the topic. Continuing with the above example, the identification information of the terminal device is the serial number A0BB3ED2BF3D, then the terminal device may subscribe to the topic cmd/A0BB3ED2BF3D, wherein the topic represents the subscription topic, the cmd is the abbreviation of command and represents the command prompt.

For the server:

the server accesses the second agent process, loads the RSA private key, and determines a candidate upgrade terminal device based on the upgrade task in response to acquiring the upgrade task. In response to receiving the message of the terminal device being online, the server determines whether the online terminal device is the candidate upgrade terminal device. In response to the online terminal device being the candidate upgrade terminal device, the server assembles the first command body, signs the first command body with the RSA private key to generate the first signature information, and assembles the version check command. Then the server sends the version check command the online candidate upgrade terminal device. Because the terminal device has subscribed to the topic cmd/A0BB3ED2BF3D, the server may send the version check command to the terminal device by Publish.

In response to receiving the command sent by the server, the terminal device first verifies, based on the RSA public key, whether signature information in the command is legal. In response to the signature information in the command being legal, the terminal device determines whether the command is a version check command or an upgrade command. In response to the command being a version check command, the terminal device sends the version check command to the shell execution program to execute the version check command; and sends the execution result, i.e., the feedback data, to the server.

In response to receiving the feedback data sent by the terminal device, the server determines whether the terminal device is to be upgraded, based on the feedback data. In response to the terminal device being not to be upgraded, the server may record the terminal device as the latest version. In response to the terminal device being to be upgraded, the server assembles the second command body, signs the second command body with the RSA private key to generate the second signature information, and assembles the upgrade command. Because the terminal device has subscribed to the topic cmd/A0BB3ED2BF3D, the server may send the upgrade command to the terminal device by Publish.

In response to receiving the command sent by the server, the terminal device first verifies, based on the RSA public key, whether signature information in the command is legal. In response to the signature information in the command being legal, the terminal device determines whether the command is a version check command or an upgrade command. In response to the command being an upgrade command, the terminal device sends the upgrade command to the upgrade program to execute the upgrade command, wherein the executing the upgrade command includes: downloading the upgrade file package, determining whether the upgrade file package is legal; in response to the upgrade file package being legal, decompressing the upgrade file package, executing the upgrade script in the upgrade file package, and sending the upgrade result to the server.

In response to the upgrade result being the upgrade success, the server may record that the terminal device is the latest version; and in response to the upgrade result being the upgrade failure, the server may record information, such as the number of failures and time of failure, wherein the information is for subsequent processing.

In some embodiments, the terminal device may perform other processing in response to receiving other commands. The terminal device may output a prompt message in response to the command being verified as illegal or the upgrade file package being verified as illegal.

With performing the embodiments in the present disclosure, in a first aspect, the server actively checks the version in the terminal device, and upgrades the terminal device only when the version is to be upgraded. In this way, the server may determine the timing of the upgrade. The server may actively disperse the upgrade time period, or actively disperse the devices storing the upgrade file packages, thus reducing the occurrence of situations that multiple devices are upgraded at the same time and the upgrade file packages in the same device are accessed at the same time, and reducing the upgrade load.

In a second aspect, in the related art, the terminal device accesses the server by polling to determine whether the latest version exists, so as to upgrade the version. In this way, the access load of the server is high. However, in the present disclosure, the server actively initiates version checking, and may actively disperse the timing of version checking, thus reducing access load.

In a third aspect, in one embodiment, the upgrade file package includes an upgrade script, and the terminal device performs the upgrade operation by executing the upgrade script. In this way, the configuration of the terminal device does not need to be modified, and the upgrade logic may be flexibly customized with the upgrade script.

In a fourth aspect, the versatility of the communication mode of the MQTT protocol is better, and there is no need for specially customized terminal device and server. The upgrading method only configures the first processing process in the terminal device and makes the server access the second processing process. The compatibility of the upgrading method is better.

In a fifth aspect, the terminal device performs signature verification and/or device identification information verification on the command, which may filter out the tampered command, and may also identify the forged command, thus improving the security of the upgrade.

Figure 4:
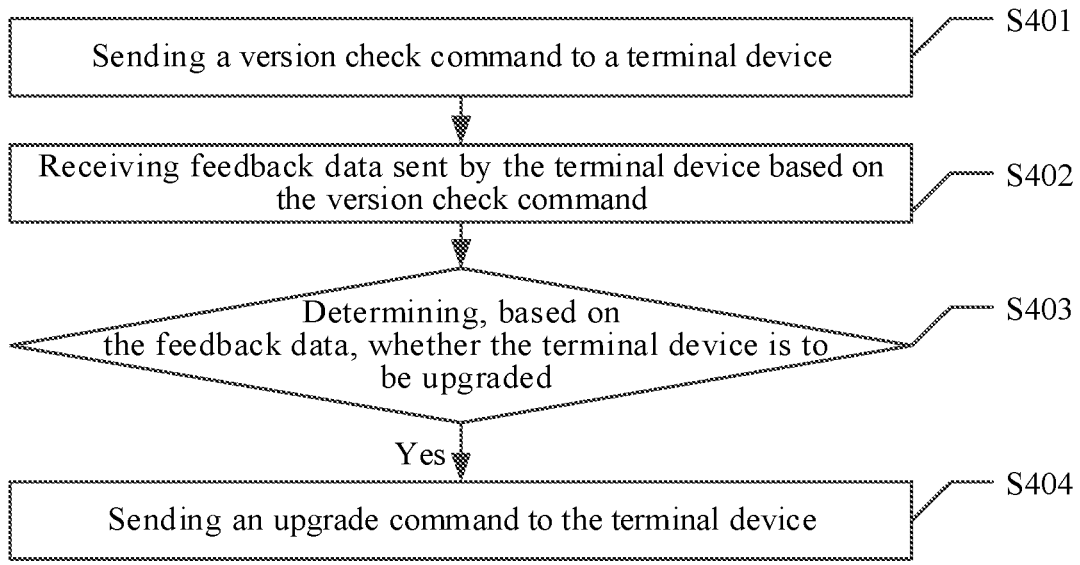
FIG. 4 is a schematic flowchart of an upgrading method applicable to a server according to an embodiment of the present disclosure.

An upgrading method applicable to a server is described hereinafter. As shown in FIG. 4, FIG. 4 is a schematic flowchart of the upgrading method applicable to the server. The method includes the following steps.

In S401, a version check command is sent to a terminal device.

In one embodiment, generating the version check command by the server may include: acquiring a first command name, a first command parameter, and identification information of the target terminal device; generating a first command body based on the first command parameter and the identification information of the terminal device; and generating a version check command including the first command name and the first command body.

The command name is the name of the command to be executed, and the command parameter is the parameter for executing the command, such as the storage directory of the version number and the identification of the object that may be upgraded. The target terminal device is the terminal device to be upgraded. The identification information of the terminal device may be the device serial number, or may be the MAC address of the terminal device, or may be other information that can identify the terminal device, which is not specifically limited.

In order to distinguish the descriptions, the command name of the version check command is called the first command name, and the command name of the upgrade command is called the second command name. The command parameter in the version check command is called the first command parameter, and the command parameter in the upgrade command is called the second command parameter. The command body in the version check command is called the first command body, and the command body in the upgrade command is called the second command body.

In another embodiment, generating the version check command by the server may include: generating the first command body based on the first command parameter and the identification information of the terminal device; generating first signature information based on the predetermined first private key and the first command body; and generating a command including the first command name, the first command body, and the first signature information.

In order to distinguish the descriptions, signature information in the version check command is called the first signature information, signature information in the upgrade command is called a second signature information. The private key for generating the first signature information is called the first private key, and the private key for generating the second signature information is called the second private key.

The server and the terminal device predetermine a public key and a private key. For example, the public key may be an RSA public key, and the private key may be an RSA private key. The server generates the signature information based on the RSA private key. The terminal device verifies, based on the RSA public key, whether the signature information is legal. It may be understood as the security verification of the version check command, which may filter out the tampered command, and may also identify the forged command, thus improving the security of the upgrade.

In one embodiment, generating the first signature information by the server may include: encoding the first command body with the first encoding algorithm to acquire an encoded command body; and generating the first signature information based on the predetermined first private key and the encoded command body. The first signature information is encoded with the second encoding algorithm to acquire encoded signature information. In this way, the signature information in the version check command is the encoded signature information.

For example, the first encoding algorithm may be a sha256 algorithm, the second encoding algorithm may be a base64 encoding algorithm, and the signature information in the command may be a base64 encoded character string. Alternatively, other encoding algorithms may also be adopted, and the specific algorithms are not limited.

In one embodiment, the version check command may be a shell command. Assuming that the candidate upgrade object is the software program file "myapp," the format of the version check command may be:

```
{
    "id":20190730002,                //ID of the command
    "from":"upgrade_server",         //identification information of the server that
sends the command, wherein the server is an upgrading server
    "command":"shell",               //command name: shell
    "body":{"cmd":"/usr/bin/myapp --version","sn":"A0BB3ED2BF3D"}, //Command
body: wherein the cmd represents the shell command to be executed, the /usr/bin represents
the installation directory of the software, the software version number may be acquired by
the
/usr/bin/myapp --version command, the sn represents the device identification information
of
the terminal device,
    "sig":"signature information"    //signature information
}
```

All the above parameters in "/usr/bin/myapp --version" may be understood as the parameters required to execute the version check command, or be interpreted as the first command parameter.

In one embodiment, S401 may include: acquiring an upgrade task, determining a candidate upgrade terminal device based on the upgrade task, and sending the version check command to an online candidate upgrade terminal device in response to detecting the candidate upgrade terminal device being online.

For example, relevant personnel may configure an upgrade task in the server, and the upgrade task includes the identification information of the terminal device that may be upgraded, download address of the upgrade file package, and the like. In one embodiment, the upgrade task may further include upgrade version number information, that is, version number information of the upgraded file or software. Alternatively, in another embodiment, the upgrade task may further include the digest value of the upgrade object, that is, the value acquired by performing the digest algorithm on the upgraded file or software. For example, the digest algorithm may be the md5 digest algorithm, and the digest value may be the md5 value. The specific content of the upgrade task is not limited.

After acquiring the upgrade task, the server determines the candidate upgrade terminal device by reading the upgrade task, wherein the candidate upgrade terminal device is the terminal device that may be upgraded. Then the server may monitor whether the candidate upgrade terminal device is online. In response to the candidate upgrade terminal device being online, the server sends a version check command to the online candidate upgrade terminal device.

In S402, the feedback data sent by the terminal device based on the version check command is received.

In one embodiment, the terminal device reads the version number information of the candidate upgrade object as the feedback data. Alternatively, in another embodiment, the terminal device reads the digest value of the candidate upgrade object as the feedback data. For example, in response to the candidate upgrade object not having a version number, the terminal device may take the digest value of the candidate upgrade object as the feedback data.

For example, the above candidate upgrade object is a software that may be upgraded, or a configuration file or other files, and the like. The specific upgrade objects are not limited.

In S403, whether the terminal device is to be upgraded is determined based on the feedback data. In response to the terminal device being to be upgraded, S404 is executed.

In one embodiment, S403 may include: reading the upgrade version number information in the upgrade task; determining whether the upgrade version number information matches with the feedback data; wherein in response to the upgrade version number information being not matched with the feedback data, the terminal device is to be upgraded.

In another embodiment, S403 may include: reading the digest value of the upgrade object in the upgrade task; determining whether the digest value of the upgrade object matches with the feedback data; wherein in response to the digest value of the upgrade object being not matched with the feedback data, the terminal device is to be upgraded.

For example, in response to the upgrade task including the upgrade version number information, the feedback data is version number information of the candidate upgrade object. In response to the upgrade version number information being matched with the version number information of the candidate upgrade object, the candidate upgrade object is already the latest version and is not to be upgraded. In response to the upgrade version number information being not matched with the version number information of the candidate upgrade object, the candidate upgrade object is not the latest version and is to be upgraded. In response to the upgrade task including the digest value of the upgrade object, the feedback data is the digest value of the candidate upgrade object. In response to the digest value of the upgrade object being matched with the digest value of the candidate upgrade object, the candidate upgrade object is already the latest version and is not to be upgraded. In response to the digest value of the upgrade object being not matched with the digest value of the candidate upgrade object, the candidate upgrade object is not the latest version and is to be upgraded.

In S404, an upgrade command is sent to the terminal device.

Continuing with the above example, the upgrade task may include the download address of the upgrade file package. In this way, the server may read the storage address of the upgrade file package in the upgrade task; and send the upgrade command including the storage address to the terminal device.

Alternatively, in another embodiment, the upgrade command may include an upgrade file package, and the terminal device is upgraded based on the upgrade file package.

In one embodiment, generating the upgrade command by the server may include: acquiring a second command name, a second command parameter, and the identification information of the target terminal device; generating the second command body based on the second command parameter and the identification information of the terminal device; and generating an upgrade command including the second command name and the second command body.

In another embodiment, generating the upgrade command by the server may include: generating the second command body based on the second command parameter and the identification information of the terminal device; generating the second signature information based on the predetermined second private key and the second command body; and generating the upgrade command including the second command name, the second command body and the second signature information.

The server and the terminal device predetermine a public key and a private key. For example, the public key may be an RSA public key, and the private key may be an RSA private key. The server generates the signature information based on the RSA private key. The terminal device verifies, based on the RSA public key, whether the signature information is legal. It may be understood as the security verification of the upgrade command, which may filter out the tampered command, and may also identify the forged command, thus improving the security of the upgrade.

In one embodiment, generating the second signature information by the server may include: encoding the command body with the first encoding algorithm to acquire the encoded command body; generating the second signature information based on the predetermined private key and the encoded command body; and encoding the signature information with the second encoding algorithm to acquire encoded signature information. In this way, the signature information in the upgrade command is the encoded signature information.

For example, the first encoding algorithm may be a sha256 algorithm, the second encoding algorithm may be a base64 encoding algorithm, and the signature information in the command may be a base64 encoded character string. Alternatively, other encoding algorithms may also be adopted, and the specific algorithms are not limited.

In one embodiment, the upgrade command may be another format of command (which is not a shell command). Still assuming that the candidate upgrade object is the software program file "myapp", the format of the upgrade command may be:

```
{
    "id":20190730003,                              //ID of the command
    "from":"upgrade_server",                       //identification information of the server that
sends the command, wherein the server is an upgrading server
    "command":"upgrade",                           //command name: upgrade
    "body":{
            "downloadCmd":"wget
http://fileserver.boe.com.cn/publicFile/M00/00/07/Cvxg910ufBSANe-bAAk2jVjzCE08302.gz
",                                                  //the download command for the upgrade package,
wherein: the wget represents the download tool, the content behind the wget represents the
download address,
            "upgradeScript":"upgrade.sh",          //the default value is upgrade.sh, which may be
omitted
            "md5":"36fe52b1f17326f64b5c625361818045", //md5 value of the upgrade
package
            "sn":"A0BB3ED2BF3D"                    //the device identification information of the
terminal device
    },                                             //command body
            "sig":"signature information"          //signature information
}
```

The above download tool and the download address and the like may all be understood as parameters required for executing the upgrade command, or be interpreted as the second command parameter. The md5 value of the upgrade package is the value acquired by calculating the upgrade package with the md5 digest algorithm. The md5 value of the upgrade package may be used to verify whether the upgrade package is tampered.

With performing the embodiments in the present disclosure, in the first aspect, the server actively checks the version in the terminal device, and upgrades the terminal device only when the version is to be upgraded. In this way, the server may determine the timing of the upgrade. The server may actively disperse the upgrade time period, or actively disperse the devices storing the upgrade file packages, thus reducing the occurrence of situations that multiple devices are upgraded at the same time and the upgrade file packages in the same device are accessed at the same time, and reducing the upgrade load. In a second aspect, the server actively initiates the version checking, and the server may actively disperse the timing of version checking, thus reducing access load.

Figure 5:
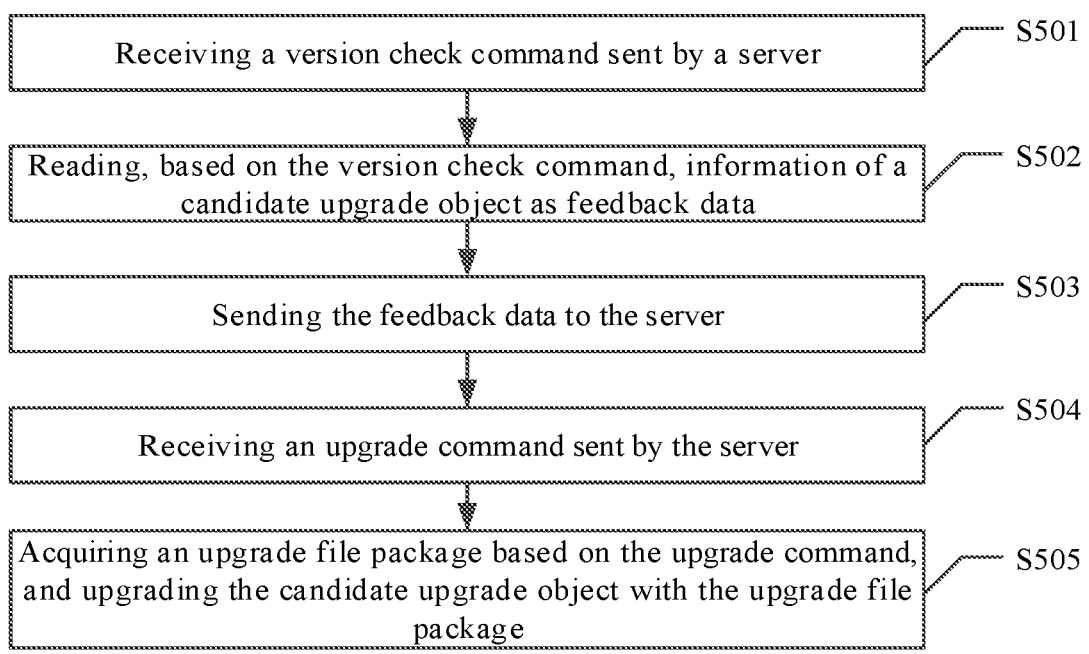
FIG. 5 is a schematic flowchart of an upgrading method applicable to a terminal device according to an embodiment of the present disclosure.

An upgrading method applicable to a terminal device is described hereinafter. The terminal device may be various devices to be upgraded, such as a router, a display terminal and a camera, which are not specifically limited. As shown in FIG. 5, FIG. 5 is a schematic flowchart of an upgrading method applicable to a terminal device. The method includes the following steps.

In S501, a version check command sent by a server is received.

In S502, information of a candidate upgrade object is read as feedback data based on the version check command.

In some embodiments, the terminal device may first perform security verification on the received version check command, and then perform S502 in response to the received version check command passing the security verification.

In one embodiment, the version check command includes the first command body and the first signature information. Upon S501, the method may further include: verifying, based on the predetermined first public key, whether the first command body matches with the first signature information, and performing S502 in response to the first command body being matched with the first signature information.

In order to distinguish the descriptions, the public key corresponding to the first private key is called the first public key, and the public key corresponding to the second private key is called the second public key.

The server and the terminal device predetermine a public key and a private key. For example, the public key may be an RSA public key, and the private key may be an RSA private key. The server generates the signature information based on the RSA private key. The terminal device verifies, based on the RSA public key, whether the encoded command body matches with decoded signature information. In response to the encoded command body being matched with the decoded signature information, the version check command is not tampered, nor is it a forged command, and then the terminal device performs the subsequent steps. It may be understood as security verification of the command (version check command or upgrade command), which may filter out the tampered command, and may also identify the forged command, thus improving the security of upgrade.

In response to receiving the version check command, the terminal device may first encode the first command body with the first encoding algorithm to acquire the encoded command body; decode the signature information with the decoding algorithm corresponding to the second encoding algorithm to acquire the decoded signature information; verify, based on the predetermined public key, whether the encoded command body matches with the decoded signature information; and perform the subsequent steps in response to the encoded command body being matched with the decoded signature information.

For example, the first encoding algorithm may be a sha256 algorithm, and the second encoding algorithm may be a base64 encoding algorithm.

In one embodiment, in response to verifying that the encoded command body being matched with the decoded signature information, the terminal device may further verify whether the device identification information in the command body is the same as the identification information of the terminal device. In response to the device identification information in the command body being the same as the identification information of the terminal device, the version check command is not tampered, nor is it a forged command, and then the terminal device performs the subsequent steps. It may be understood as the security verification of the version check command, which may further filter out the tampered command, and may also further identify the forged command, thus further improving the security of the upgrade.

The candidate upgrade object is a software that may be upgraded, or a configuration file or other files, and the like. The specific upgrade objects are not limited. In one embodiment, the version number information of the candidate upgrade object may be read as the feedback data. Alternatively, in another embodiment, the digest value of the candidate upgrade object may be read as the feedback data. The digest value may be a value acquired by performing the digest algorithm on the candidate upgrade object. For example, the digest algorithm may be an md5 digest algorithm, and the digest value may be an md5 value. For example, in response to the candidate upgrade object not having a version number, the terminal device may take the digest value of the candidate upgrade object as the feedback data.

In S503, the feedback data is sent to the server.

In S504, an upgrade command sent by the server is received.

The upgrade command is sent in response to the server determining, based on the feedback data, that the terminal device is to be upgraded.

In some embodiments, the terminal device may first perform security verification of the received upgrade command, and then perform S505 in response to the received upgrade command passing the security verification.

In one embodiment, the upgrade command includes a second command body and second signature information; upon S504, the method may further include: verifying whether the second command body matches with the second signature information based on the predetermined second public key, and performing S505 in response to the second command body being matched with the second signature information.

The process of performing the security verification of the upgrade command is similar to the process of performing the security verification of the version check command, which is not repeated here.

In S505, an upgrade file package is acquired based on the upgrade command, and the candidate upgrade object is upgraded with the upgrade file package.

In one embodiment, S505 may include: reading the storage address of the upgrade file package in the upgrade command; acquiring the upgrade file package based on the storage address; decompressing the upgrade file package to acquire the upgrade script; and performing the upgrade operation by executing the upgrade script.

For example, the upgrade package may include the upgrade script upgrade.sh, other files required for the upgrade, and the like. The terminal device may execute the upgrade script upgrade.sh, which performs the upgrade operation automatically based on the files in the upgrade package. In this way, there is no need to modify the configuration of the terminal device, and the upgrade logic may be flexibly customized with the upgrade script.

With performing the embodiments in the present disclosure, in one embodiment, the upgrade file package includes an upgrade script, and the terminal device performs the upgrade operation by executing the upgrade script. In this way, there is no need to modify the configuration of the terminal device, the flexible customization of the upgrade logic may be realized with the upgrade script. In a second aspect, the terminal device performs signature verification and/or device identification information verification on the command, which may filter out the tampered command and identify the forged command, thus improving the security of the upgrade.

Figure 6:
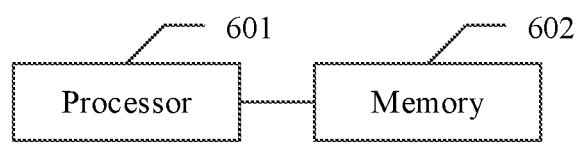
FIG. 6 is a schematic structural diagram of a server according to an embodiment of the present disclosure.

Corresponding to the above method embodiments, an embodiment of the present disclosure also provides a server. As shown in FIG. 6, the server includes: a memory 602, a processor 601, and a computer program stored in the memory 602 and runnable on the processor 601, wherein the processor 601, when running the computer program, is caused to perform any of the above upgrading methods applicable to the server.

Figure 7:
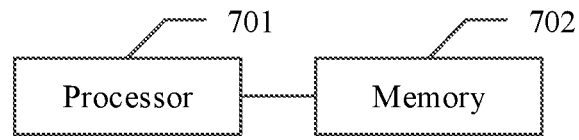
FIG. 7 is a schematic structural diagram of a terminal device according to an embodiment of the present disclosure.

Corresponding to the above method embodiments, an embodiment of the present disclosure also provides a terminal device. As shown in FIG. 7, the terminal device includes: a memory 702, a processor 701, and a computer program stored in the memory 702 and runnable on the processor 701, wherein the processor 701, when running the computer program, is caused to perform any of the above upgrading methods applicable to the terminal device.

Figure 8:
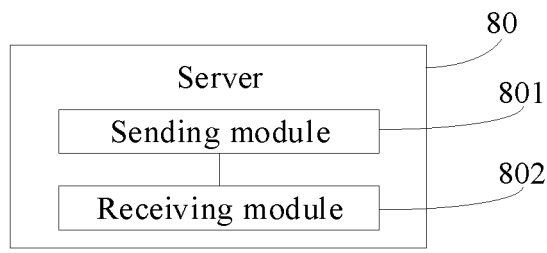
FIG. 8 is a schematic structural diagram of another server according to an embodiment of the present disclosure.

FIG. 8 is a schematic structural diagram of another server according to an embodiment of the present disclosure. As shown in FIG. 8, the server 80 includes: a sending module 801, configured to send a version check command to the terminal device; and a receiving module 802, configured to receive the feedback data sent by the terminal device based on the version check command.

The sending module 801 is further configured to send an upgrade command to the terminal device in response to the terminal device being to be upgraded, wherein whether the terminal device is to be upgraded is determined based on the feedback data.

Optionally, the sending module 801 is configured to acquire the upgrade task, determine the candidate upgrade terminal device based on the upgrade task, and send a version check command to an online candidate upgrade terminal device in response to detecting the candidate upgrade terminal device being online.

Figure 9:
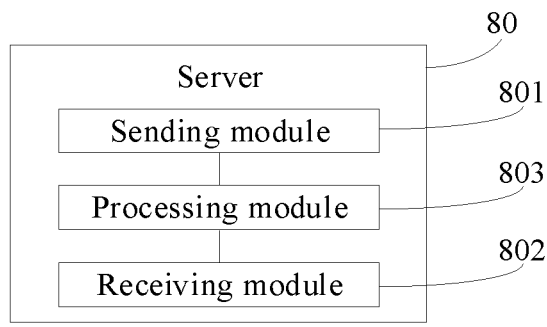
FIG. 9 is a schematic structural diagram of yet another server according to an embodiment of the present disclosure.

Optionally, as shown in FIG. 9, the server 80 further includes a processing module 803.

Optionally, the upgrade task includes the upgrade version number information, and the feedback data includes the version number information of the candidate upgrade object of the terminal device. The processing module 803 is configured to read the upgrade version number information in the upgrade task, and determine that the terminal device is to be upgraded in response to the upgrade version number information being not matched with the feedback data.

Optionally, the upgrade task includes the digest value of the upgrade object, and the feedback data includes the digest value of the candidate upgrade object of the terminal device. The processing module 803 is configured to read the digest value of the upgrade object in the upgrade task, and determine that the terminal device is to be upgraded in response to the digest value of the upgrade object being not matched with the feedback data.

Optionally, the upgrade task includes the storage address of the upgrade file package. The sending module 801 is configured to read the storage address of the upgrade file package in the upgrade task, and send an upgrade command including the storage address to the terminal device.

Optionally, the processing module 803 is configured to: generate a first command body based on the first command parameter and the identification information of the terminal device; generate first signature information based on the predetermined first private key and the first command body; and generate a version check command including the first command name, the first command body and the first signature information; wherein the first command parameter includes a command parameter in the version check command, the first command body includes a command body in the version check command, and the first signature information includes signature information in the version check command, and the first command name is the name of the version check command.

Optionally, the processing module 803 is configured to: acquire the first command name, the first command parameter, and the identification information of the terminal device; generate the first command body based on the first command parameter and the identification information of the terminal device; and generate the version check command including the first command name and the first command body; wherein the first command name is the name of the version check command, the first command parameter includes the command parameter in the version check command, and the first command body includes the command body in the version check command.

Optionally, the processing module 803 is configured to: generate a second command body based on the second command parameter and the identification information of the terminal device; generate second signature information based on the predetermined second private key and the second command body; and generate an upgrade command including the second command name, the second command body and the second signature information; wherein the second command parameter includes a command parameter in the upgrade command, the second command body includes a command body in the upgrade command, and the second signature information includes signature information in the upgrade command, and the second command name is the name of the upgrade command.

Optionally, the processing module 803 is configured to: acquire the second command name, the second command parameter, and the identification information of the terminal device; generate the second command body based on the second command parameter and the identification information of the terminal device; and generate the upgrade command including the second command name and the second command body; wherein the second command name is the name of the upgrade command, the second command parameter includes the command parameter in the upgrade command, and the second command body includes the command body in the upgrade command.

Figure 10:
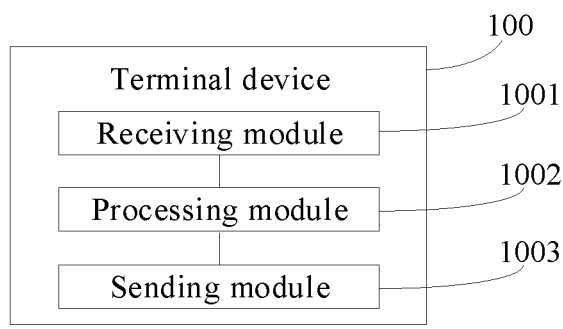
FIG. 10 is a schematic structural diagram of another terminal device according to an embodiment of the present disclosure.

FIG. 10 is a schematic structural diagram of another terminal device according to an embodiment of the present disclosure. As shown in FIG. 10, the terminal device 100 includes: a receiving module 1001, configured to receive the version check command sent by the server; a processing module 1002, configured to read information of the candidate upgrade object based on the version check command as the feedback data; and a sending module 1003, configured to send the feedback data to the server.

The receiving module 1001 is further configured to receive the upgrade command sent by the server, wherein the upgrade command is sent in response to the server determining, based on the feedback data, that the terminal device is to be upgraded.

The processing module 1002 is further configured to acquire an upgrade file package based on the upgrade command, and upgrade the candidate upgrade object with the upgrade file package.

Optionally, the processing module 1002 is configured to: read version number information of the candidate upgrade object as the feedback data; or read the digest value of the candidate upgrade object as the feedback data.

Optionally, the processing module 1002 is configured to: read the storage address of the upgrade file package in the upgrade command; acquire the upgrade file package based on the storage address; decompress the upgrade file package to acquire the upgrade script; and perform the upgrade operation by executing the upgrade script.

Optionally, the version check command includes a first command body and first signature information. The processing module 1002 is further configured to: verify, based on the predetermined first public key, whether the first command body and the first signature information are matched with each other; and read the information of the candidate upgrade object as the feedback data based on the version check command in response to the first command body being matched with the first signature information.

Optionally, the upgrade command includes a second command body and second signature information. The processing module 1002 is further configured to: verify, based on the predetermined second public key, whether the second command body matches with the second signature information; and acquire the upgrade file package based on the upgrade command in response to the second command body being matched with the second signature information.

For the devices in the above embodiments, the details of operations performed by various modules have been described in detail in the embodiments related to the method, which are not described in detail here.

The embodiments of the present disclosure also provide a non-transitory computer-readable storage medium (also referred to as a computer non-transitory readable storage medium), wherein the non-transitory computer-readable storage medium stores a computer instruction, which, when running on a processor of a computer, causes the computer to perform any one of the above upgrading methods.

Those of ordinary skill in the art should understand that, the discussion of any of the above embodiments is only exemplary, and is not intended to imply that the scope of the present disclosure (including the claims) is limited to these examples. With the idea of the present disclosure, the above embodiments or the technical features in different embodiments may also be combined, the steps may be performed in any order, and there are many other changes in different aspects of the present disclosure as described above, and they are not provided in the details for the sake of brevity.

In addition, in order to simplify the description and discussion, and in order not to make the present disclosure difficult to understand, the figures provided may or may not show the well-known power supply/ground connection associated with integrated circuit (IC) chips and other components. In addition, the devices may be shown in the form of block diagrams so as to avoid making the present disclosure difficult to understand, and it also takes into account the fact that the details of the embodiments of the devices in the block diagrams are highly dependent on the platform on which the present disclosure is implemented (that is, the details should be fully within the scope of the understanding of those skilled in the art). In the case where specific details (for example, circuits) are stated to describe exemplary embodiments of the present disclosure, it is obvious to those skilled in the art that it may be possible to implement the present disclosure without these specific details or when these specific details are changed. Therefore, these descriptions should be considered to be illustrative rather than restrictive.

Although the present disclosure has been described in conjunction with specific embodiments of the present disclosure, many substitutions, modifications and variations of these embodiments will be apparent to those of ordinary skill in the art according to the above description. For example, other memory architectures (e.g., dynamic RAM (DRAM)) may adopt the discussed embodiments.

The embodiments of the present disclosure are intended to cover all such substitutions, modifications, and variations that fall within the broad scope of the appended claims. Therefore, any omissions, modifications, equivalent substitutions, improvements and the like made within the concept and principle of the present disclosure should be included in the protection scope of the present disclosure.

What is claimed is:

1. An upgrading method applicable to a server, the method comprising:
sending a version check command to a terminal device;
receiving feedback data sent by the terminal device based on the version check command; and
sending an upgrade command to the terminal device in response to determining, based on the feedback data, that the terminal device is to be upgraded;
and the method further comprising:
generating a first command body based on a first command parameter and identification information of the terminal device;
generating first signature information based on a predetermined first private key and the first command body; and
generating the version check command comprising a first command name, the first command body, and the first signature information;
wherein the first command parameter comprises a command parameter in the version check command, the first command body comprises a command body in the version check command, and the first signature information comprises signature information in the version check command, and the first command name is a name of the version check command.

2. The method according to claim 1, wherein sending the version check command to the terminal device comprises:
acquiring an upgrade task;
determining a candidate upgrade terminal device based on the upgrade task; and
sending the version check command to an online candidate upgrade terminal device in response to detecting the candidate upgrade terminal device being online.

3. The method according to claim 2, wherein the upgrade task comprises upgrade version number information, and the feedback data comprises version number information of a candidate upgrade object of the terminal device; and the method further comprising:
reading the upgrade version number information in the upgrade task; and
determining that the terminal device is to be upgraded in response to the upgrade version number information being not matched with the feedback data.

4. The method according to claim 2, wherein the upgrade task comprises a digest value of an upgrade object, and the feedback data comprises a digest value of a candidate upgrade object of the terminal device; and the method further comprising:
reading the digest value of the upgrade object in the upgrade task; and
determining that the terminal device is to be upgraded in response to the digest value of the upgrade object being not matched with the feedback data.

5. The method according to claim 2, wherein the upgrade task comprises a storage address of an upgrade file package; and sending the upgrade command to the terminal device comprises:
reading the storage address of the upgrade file package in the upgrade task; and
sending the upgrade command comprising the storage address to the terminal device.

6. The method according to claim 1, further comprising:
generating a second command body based on a second command parameter and identification information of the terminal device;
generating second signature information based on a predetermined second private key and the second command body; and
generating the upgrade command comprising a second command name, the second command body, and the second signature information;
wherein the second command parameter comprises a command parameter in the upgrade command, the second command body comprises a command body in the upgrade command, the second signature information comprises signature information in the upgrade command, and the second command name is a name of the upgrade command.

7. The method according to claim 1, further comprising:
acquiring a second command name, a second command parameter, and identification information of the terminal device;
generating a second command body based on the second command parameter and the identification information of the terminal device; and
generating the upgrade command comprising the second command name and the second command body;
wherein the second command name is a name of the upgrade command, the second command parameter comprises a command parameter in the upgrade command, and the second command body comprises a command body in the upgrade command.

8. An upgrading method applicable to a terminal device, the method comprising:
receiving a version check command sent by a server;
reading information of a candidate upgrade object based on the version check command as feedback data;
sending the feedback data to the server;
receiving an upgrade command sent by the server, wherein the upgrade command is sent in response to the server determining, based on the feedback data, that the terminal device is to be upgraded; and
acquiring an upgrade file package based on the upgrade command, and upgrading the candidate upgrade object with the upgrade file package;
wherein the version check command comprises a first command body and first signature information; and upon receiving the version check command sent by the server, the method further comprises:
verifying, based on a predetermined first public key, whether the first command body is matched with the first signature information;
wherein reading the information of the candidate upgrade object based on the version check command as the feedback data comprises:
reading the information of the candidate upgrade object based on the version check command as the feedback data in response to the first command body being matched with the first signature information.

9. The method according to claim 8, wherein
acquiring the upgrade file package based on the upgrade command comprises:
reading a storage address of the upgrade file package in the upgrade command; and
acquiring the upgrade file package based on the storage address; and
upgrading the candidate upgrade object with the upgrade file package comprises:
decompressing the upgrade file package to acquire an upgrade script; and
performing an upgrade operation by executing the upgrade script.

10. The method according to claim 8, wherein the upgrade command comprises a second command body and second signature information; and upon receiving the upgrade command sent by the server, the method further comprises:
verifying, based on a predetermined second public key, whether the second command body is matched with the second signature information; and
acquiring the upgrade file package based on the upgrade command comprises:
acquiring the upgrade file package based on the upgrade command in response to the second command body being matched with the second signature information.

11. An upgrading system, comprising a server and a terminal device; wherein
the server is configured to perform the method as defined in claim 1;
the terminal device is configured to receive the version check command, read information of a candidate upgrade object as feedback data based on the version check command, and send the feedback data to the server;
the terminal device is further configured to acquire an upgrade file package based on the upgrade command in response to receiving the upgrade command, and upgrade the candidate upgrade object with the upgrade file package.

12. A server comprising a memory, a processor, and a computer program stored in the memory and runnable on the processor, wherein the processor, when running the computer program, is caused to:
send a version check command to a terminal device;
receive feedback data sent by the terminal device based on the version check command; and
send an upgrade command to the terminal device in response to determining, based on the feedback data, that the terminal device is to be upgraded;
the processor, when running the computer program, is further caused to:
generate a first command body based on a first command parameter and identification information of the terminal device;
generate first signature information based on a predetermined first private key and the first command body; and
generate the version check command comprising a first command name, the first command body, and the first signature information;
wherein the first command parameter comprises a command parameter in the version check command, the first command body comprises a command body in the version check command, and the first signature information comprises signature information in the version check command, and the first command name is a name of the version check command.

13. A terminal device, comprising a memory, a processor, and a computer program stored in the memory and runnable on the processor, wherein the processor, when running the computer program, is caused to perform the method as defined in claim 8.

14. A non-transitory computer-readable storage medium storing a computer program therein, wherein the computer program in the computer non-transitory readable storage medium, when running on a processor of a server, causes the processor to perform the method as defined in claim 1, and when running on a processor of a terminal device, causes the processor to:
- receive a version check command sent by a server, wherein the version check command comprises a first command body and first signature information;
- read information of a candidate upgrade object based on the version check command as feedback data;
- send the feedback data to the server;
- receive an upgrade command sent by the server, wherein the upgrade command is sent in response to the server determining, based on the feedback data, that the terminal device is to be upgraded; and
- acquire an upgrade file package based on the upgrade command, and upgrading the candidate upgrade object with the upgrade file package;

wherein upon receiving the version check command sent by the server, the processor is further caused to:
- verify, based on a predetermined first public key, whether the first command body is matched with the first signature information.

15. The server according to claim 12, wherein the processor, when running the computer program, is caused to:
- acquire an upgrade task;
- determine a candidate upgrade terminal device based on the upgrade task; and
- send the version check command to an online candidate upgrade terminal device in response to detecting the candidate upgrade terminal device being online.

16. The server according to claim 15, wherein the upgrade task comprises upgrade version number information, and the feedback data comprises version number information of a candidate upgrade object of the terminal device; the processor, when running the computer program, is further caused to:
- read the upgrade version number information in the upgrade task; and
- determine that the terminal device is to be upgraded in response to the upgrade version number information being not matched with the feedback data.

\* \* \* \* \*